May 4, 1926.
J. TESSIER
MOTION PICTURE CAMERA
Filed Feb. 12, 1923
1,583,707
3 Sheets-Sheet 1
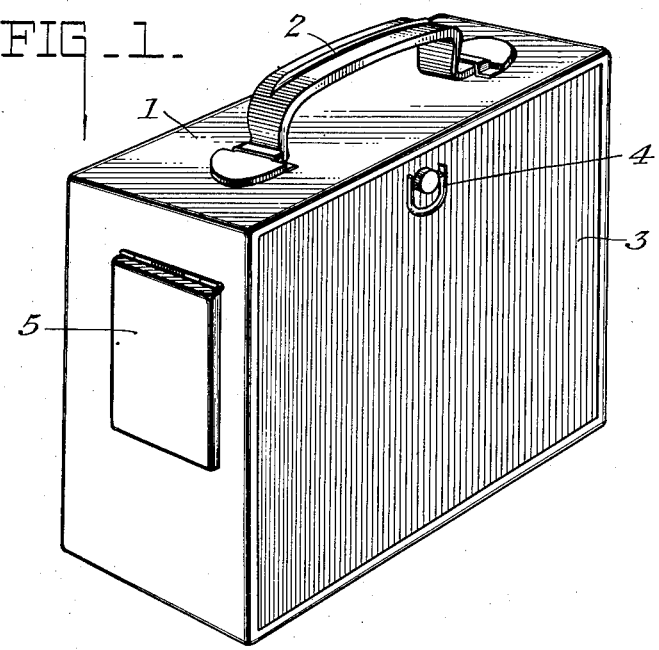
FIG_1.
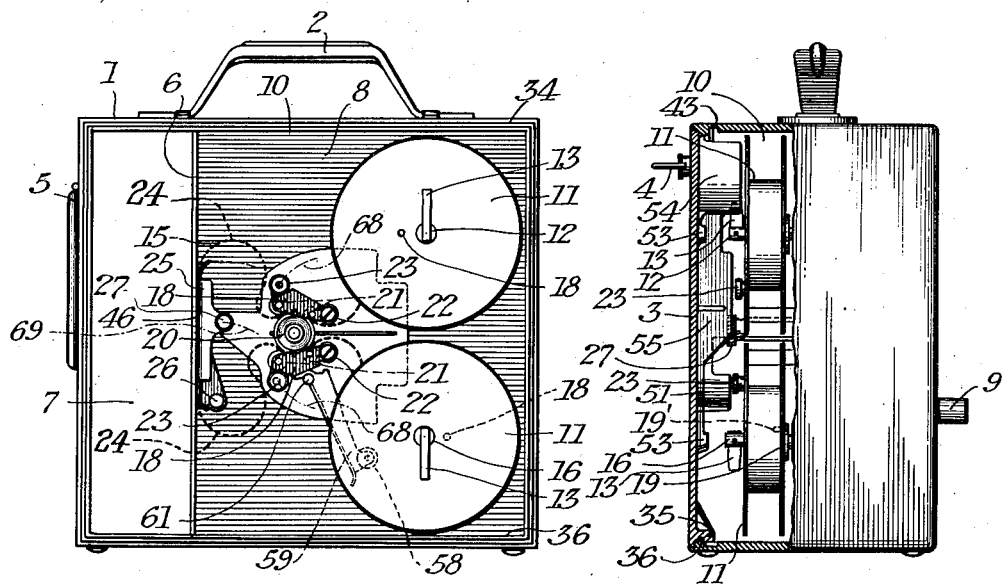
FIG_2.
FIG_3.
INVENTOR.
Julien Tessier,
BY
ATTORNEYS.

May 4, 1926.
J. TESSIER
1,583,707
MOTION PICTURE CAMERA
Filed Feb. 12, 1923
3 Sheets-Sheet 2
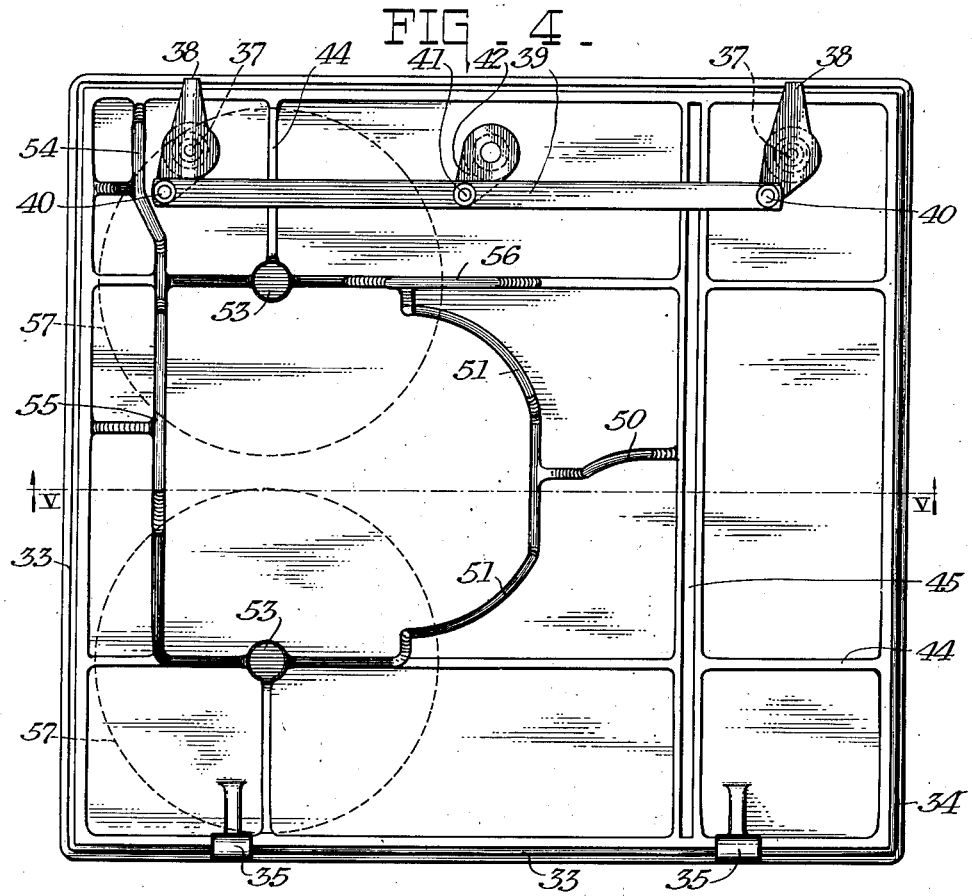
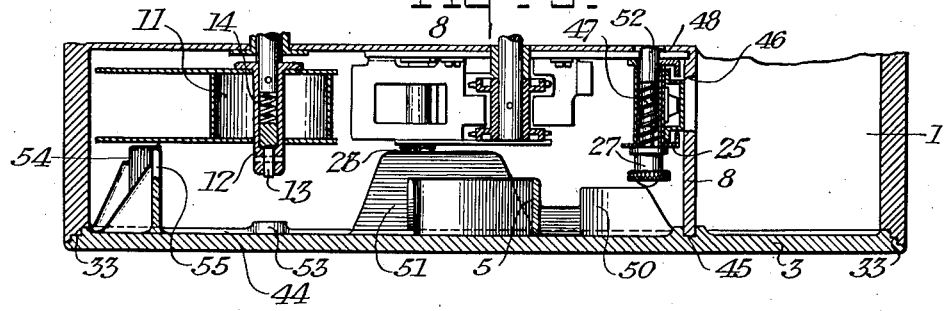
INVENTOR.
Julien Tessier,
BY
ATTORNEYS.

May 4, 1926.
J. TESSIER
1,583,707
MOTION PICTURE CAMERA
Filed Feb. 12, 1923   3 Sheets-Sheet 3
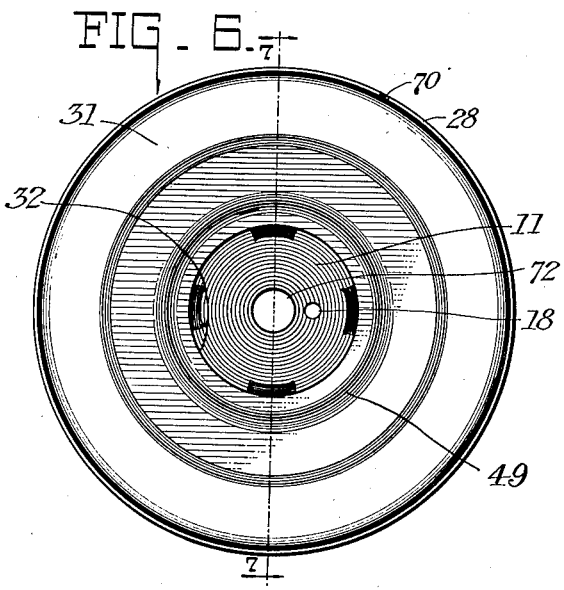
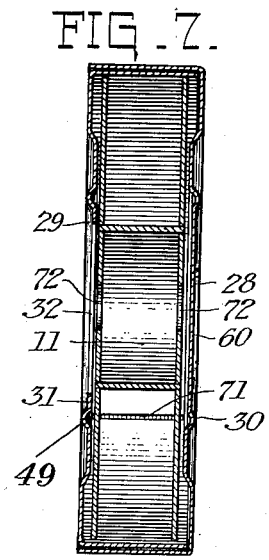
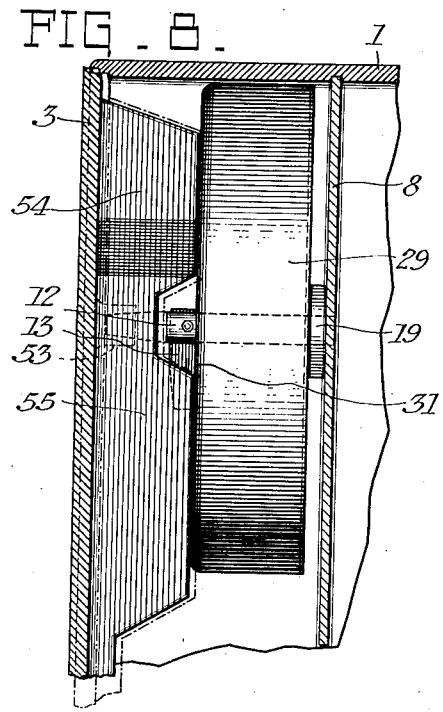
INVENTOR.
Julien Tessier,
BY R. L. Stinchfield
N. M. Brooks
ATTORNEYS.

Patented May 4, 1926.

1,583,707

UNITED STATES PATENT OFFICE.

JULIEN TESSIER, OF ROCHESTER, NEW YORK, ASSIGNOR TO EASTMAN KODAK COMPANY, OF ROCHESTER, NEW YORK, A CORPORATION OF NEW YORK.

MOTION-PICTURE CAMERA.

Application filed February 12, 1923. Serial No. 618,467.

*To all whom it may concern:*

Be it known that I, JULIEN TESSIER, a citizen of the Republic of France, residing at Rochester, in the county of Monroe and State of New York, have invented certain new and useful Improvements in Motion-Picture Cameras, of which the following is a full, clear, and exact specification.

This invention relates to motion picture cameras and more particularly to such cameras designed for use by amateurs and unskilled persons.

The principal object of this invention is the provision of means whereby it will be impossible to close or use the camera unless all the parts that require manipulation in connection with the loading of the camera are in the correct or operative position. This object is attained by placing on the door of the camera projections so shaped and proportioned in relation to the movable operative parts of the camera that the door cannot be closed unless all such parts are properly positioned. Other objects will appear hereinafter.

Reference will now be made to the accompanying drawings in which the same reference characters designate the same parts throughout, and in which—

Fig. 1 is a perspective view of the closed camera;

Fig. 2 is an elevation of the camera with the door removed;

Fig. 3 is a rear end view of the camera with the door on, showing the loading compartment in section;

Fig. 4 is an elevation of the inner side of the door;

Fig. 5 is a section of the door and loading compartment looking up, the section being made along the line of the door indicated at V—V on Fig. 4, and certain parts being omitted;

Fig. 6 is an elevation of the film magazine designed for use with the camera;

Fig. 7 is a section on line 7—7 of Fig. 6;

Fig. 8 is a fragmentary sectional view of the loading compartment showing the position of the door if the reel container has not been removed.

The camera comprises a casing or box 1, having a carrying handle 2, one of the sides 3 being removable and constituting a door, the latches of which are controlled by handle 4. On the front is a hinged protective cover 5 shown as folded down and concealing the objective and finder openings. The camera is divided transversely by a partition 6 in front of which is a compartment 7 carrying operating parts not shown and of no interest in the present specification. It is further divided longitudinally by a partition 8, on one side of which is a compartment containing mechanism of no present interest and driven by the operating handle 9. There is thus formed by the partitions 6 and 8 a compartment 10 which is rendered accessible by the removal of door 3, and which contains the mechanism for feeding, guiding and taking up the film. This mechanism is of the type disclosed more fully in my co-pending application, Serial No. 378,616, filed May 3, 1920.

As there described, a reel 11 is mounted to turn loosely on a supply shaft 12 carried by partition 8, and having a hinged latch 13 held by spring 14 either in latching position perpendicular to shaft 12 or extending out therefrom, as indicated in dotted lines in Fig. 8. From this reel the film 15 extends in a loop through the mechanism to a similar reel 11 mounted on a take-up shaft 16 driven by mechanism not shown, and secured by a second latch 13 similar to the first. This reel has an aperture 18 on the side that is outermost in the supply position and that engages a lug 19' (Fig. 3) on a flange 19 carried by the take-up shaft 16. The loop of film 15 between the reels 11 engages opposite sides of a sprocket wheel 20 being held thereagainst by rollers 21 carried by presser member 18 pivoted at 22 and movable by the spring finger catches 23 to and from engaging position.

The film 15 extends in loops 24 from the sprocket to the exposure window 46 and back, being pressed into exposure position by a gate 25 hinged at 26 and movable by the finger catch 27, pressed by spring 47 into latching engagement with aperture 48 in partition 8 when the gate is closed. The finger catches 23 are similar in construction to the catch 27.

The film intended for use in this camera is supplied in magazines of the "pill box" type comprising shallow cylindrical members 28 and 29, the flanges of which fit one within the other. The cover member 28 has an imperforate side 60 which is ridged as indicated at 30 to add rigidity, and the bottom member has in its side 31 similar ridges 49 and an axial opening 32 of greater radius than the length of latch 13. In this magazine the reel 11 fits rather closely. Slots 70, 71 are provided in the flanges of the two members. For clearness the film is not shown in Fig. 7.

The removable door 3 has around its edges rabbets 33 adapted to fit corresponding rabbets 34 in the edges of the box. Near the bottom of the door are overhanging lugs 35 adapted to fit over flange 36 in the camera; and near the top of the door are pivoted at 37 two latches 38 connected by a rod 39 pivoted at 40 thereto and at 41 to an extension 42 operated by the handle 4. These latches are adapted to engage behind flange 43 in the camera. The door is closed by engaging the lugs 35 over the flange 36 and swinging it with a pivoting motion to closed position when the handle 4 is turned to engage the latches 38 over flange 43. The door is so balanced that it will not remain closed, but will fall open if the latches are not turned.

On the inner face of door 3 are strengthening flanges 44, two of which are positioned to form a seat 45 for the edge of the transverse partition 6. Opposite the path of movement of finger latch 27 on the gate there is on the door a curved projection 50 extending such a distance that it will engage this catch and prevent the closing of the door unless the catch is in the position shown in Figure 5, that is, with its inner end 52 in engagement with aperture 48. In order to open the gate this catch must be retracted and its inner end 52 rides on the surface of the partition as the gate is opened. It is, therefore, necessary that the gate be closed properly before the door 3 can be closed. The path of movement of the latch is indicated in Fig. 2 by dotted dash line 69.

Opposite the paths of movement of finger catches 23 on the pivoted presser members 18 there are on the inner face of door 3 curved projections 51 which have the same relation to catches 23 as 50 has to 27. That is, the door cannot be completely closed unless the presser members 18 are in operative or closed position and the catches 23 in latching position. The paths of movement of these catches are indicated in Fig. 2 by dot-dash lines 68.

In line with the shafts 12 and 16 there are on the inner face of door 3, projections 53 which extend such a distance that they engage the latches 13 if the latter are in extended position, and thus prevent the complete closing of the door, the relation of the projection and the latches being represented in Fig. 8. It is, therefore, necessary for the user to close the latches down before the door can be closed.

In using the magazine herein described the operator first removes the cover 28. It is impossible to place the magazine with the cover in the camera since the cover is imperforate. The reel 11 in the box member 29 is placed in the camera, the apertures 72 of the reel being placed on the shaft, which extends past the box member, this being left on as long as possible as an additional protection against light. The latch is then turned down, the reel being thus secured in place, and the film threaded through the mechanism. When everything else is ready the magazine element is removed and the door closed. As the aperture 32 is large, it passes readily over the closed latch. In order that the magazine element may not be inadvertently left in the camera and as a precaution against applying the reel with the magazine element inside, there are on the inner face of the cover 3 three projections 54, 44 and 56 which extend nearly to the outer surface of reel 11, when properly positioned. If the magazine part is on the reel, the projections will engage it and prevent the complete closing of the door, the partially closed position of which would be as shown in Fig. 8; the completely closed position being indicated in a dot-dash line. These projections, it is to be noted, extend outwardly beyond the periphery of the reel, the dimension of which is indicated as dotted circles 57 in Fig. 4. They thus act as guards to prevent the outermost convolutions of film which may possibly loosen or uncoil on the supply reel from moving transversely from position. With the take-up reel this end is attained by roller 58 carried by the spring presser arm 59 pivoted at 61 to the lower presser member 18. This roller 58 bears against the outermost convolution of film on the take-up reel and prevents uncoiling.

From the above description it is obvious that if any one of the following steps is incorrectly performed or omitted the door will not be closed and latched; the upper reel is properly positioned, the upper latch is closed, the upper presser member is closed, the lower presser member is closed, the gate is closed, the lower reel is properly positioned, the lower latch is closed, the magazine member is removed from the upper reel, the door is closed and latched.

It is thus apparent that it is impossible for the user to close the camera unless all the parts are properly positioned. The projections, moreover, positively prevent any accidental unlatching and opening of the gate or presser members or uncoiling of the film during use.

It is obvious that numerous changes may be made in the structure here disclosed, and I contemplate as within the scope of my invention all such modifications and equivalents as fall within the scope of the appended claims.

Having thus described my invention, what

I claim as new and desire to secure by Letters Patent is:

1. Motion picture apparatus comprising a casing open at one side and constituting a film exposing compartment, a door adapted to cover said open side, means within said compartment for feeding a film, a movable member having an operative position in which it is adapted to engage and position a film with respect to said feeding means, and movable to an inoperative position, and a projection on the inner side of the door adapted to extend, when the door is closed, into the path of movement of said member and to prevent the complete closure of the door when the member is not in operative position.

2. Motion picture apparatus comprising a casing open at one side and constituting a film exposing compartment, a door adapted to cover said open side, means for feeding a film to and from exposure position, movable members having operative positions at which they are adapted to engage and position a film with respect to said feeding means and movable to inoperative positions, and projections on the inner side of the door and adapted to extend, when the door is closed, into the paths of movement of said members and to prevent the complete closure of the door unless all the members are in operative position.

3. Motion picture apparatus comprising a casing open at one side and constituting a film exposing compartment, a door adapted to cover said open side, means for feeding a film to and from exposure position, movable members having operative positions at which they are adapted to engage a film during such feeding, and movable to inoperative positions, and a movable member adapted to position a film at the exposure position and movable to an inoperative position and projections on the inner side of the door and adapted to extend, when the door is closed, into the paths of movement of said members.

4. Motion picture apparatus comprising a casing open at one side and constituting a film exposing compartment, a door adapted to cover said open side, means in said compartment for supporting supply and take-up film reels in operative positions, means in said compartment for supporting a loop of film between such reels in exposure position and in feed positions between such reels and such exposure position, and means on the inner side of the door adapted to engage said reels or said means if any of these are in improper position as the door is moved toward closed position, and thus prevent the complete closing of the door.

5. Motion picture apparatus comprising a casing open at one side and constituting a film exposing compartment, a door adapted to cover said open side, means wholly in said compartment for supporting and securing supply and take-up reels in operative positions, movable means wholly in said compartments for supporting a loop of film between such reels in exposure positions and in feed positions between such reels and such exposure positions, and projections on the inner side of the door so positioned and dimensioned as to engage such reels or said means if any of these are in improper position as the door is moved toward closed position and thus prevent the complete closing of the door.

6. Motion picture apparatus comprising a casing open at one side and constituting a film exposing compartment, a door adapted to cover said open side, means for feeding a film through said compartment, means adapted to support a film reel in operative position with its axis perpendicular to the door when the latter is closed, projections on the door so positioned and dimensioned that, when a reel is properly positioned, they will extend into close propinquity thereto and portions of the projections will extend beyond the periphery of the reel, whereby said projections serve both to insure that the reel is properly positioned before the door is closed and that convolutions of film on the reel may not be displaced laterally.

Signed at Rochester, New York, this 7th day of February 1923.

JULIEN TESSIER.